(12) United States Patent
Xie (10) Patent No.: US 10,698,373 B2
(45) Date of Patent: Jun. 30, 2020

(54) DEVICE IN HOME NETWORK AND METHOD FOR EXECUTING INSTRUCTION IN HOME NETWORK

(71) Applicant: Beijing Zhigu Rui Tuo Tech Co., Ltd, Beijing (CN)

(72) Inventor: Xiting Xie, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 645 days.

(21) Appl. No.: 14/781,585

(22) PCT Filed: Dec. 10, 2013

(86) PCT No.: PCT/CN2013/088934
§ 371 (c)(1),
(2) Date: Oct. 1, 2015

(87) PCT Pub. No.: WO2015/024331
PCT Pub. Date: Feb. 26, 2015

(65) Prior Publication Data
US 2016/0054715 A1    Feb. 25, 2016

(30) Foreign Application Priority Data
Aug. 23, 2013   (CN) .......................... 2013 1 0373768

(51) Int. Cl.
*G05B 15/02*   (2006.01)
*H04L 12/28*   (2006.01)

(52) U.S. Cl.
CPC ............ *G05B 15/02* (2013.01); *H04L 12/282* (2013.01); *H04L 12/2816* (2013.01)

(58) Field of Classification Search
CPC .... G05B 15/02; H04L 12/2816; H04L 12/282
(Continued)

(56) References Cited

U.S. PATENT DOCUMENTS

| 7,698,467 B2 | 4/2010 | Kim et al. |
| 2005/0096753 A1* | 5/2005 | Arling .................... G05B 15/02 700/11 |

(Continued)

FOREIGN PATENT DOCUMENTS

| CN | 1275750 A | 12/2000 |
| CN | 101127671 A | 2/2008 |

(Continued)

OTHER PUBLICATIONS

International Search Report dated May 28, 2014 for PCT Application No. PCT/CN2013/088934, 4 pages.

*Primary Examiner* — Jigneshkumar C Patel
(74) *Attorney, Agent, or Firm* — Amin, Turocy & Watson, LLP (57) ABSTRACT

A method includes: an obtaining step, in which a first device in the home network obtains the instruction; a query step, in which the first device queries for at least one particular device meeting a predetermined condition in the home network; and a notification step, in which the first device notifies the particular device of the instruction. A user does not need to directly send an instruction to a particular device that executes the instruction; instead, the user only needs to make sure that any device in the home network obtains the instruction. The user can enable a most suitable device to execute the instruction automatically without knowing a large amount of detailed information such as device performance. Therefore, not only is full use of functions and features of devices in the home network made, but also user operations are significantly facilitated, improving user experience for users.

37 Claims, 4 Drawing Sheets

(58) Field of Classification Search
USPC .......................................................... 700/275
See application file for complete search history.

(56) References Cited

U.S. PATENT DOCUMENTS

| | | | | |
|---|---|---|---|---|
| 2007/0124447 | A1* | 5/2007 | Ajitomi | ............... H04L 12/2832 709/223 |
| 2009/0178040 | A1* | 7/2009 | Cho | ........................ G06F 9/542 718/100 |
| 2010/0064351 | A1* | 3/2010 | Johansson | ........... H04L 12/2809 726/4 |
| 2010/0191352 | A1* | 7/2010 | Quail | .................. H04L 12/2809 700/90 |
| 2010/0195001 | A1* | 8/2010 | Doyle | .................... G08C 17/02 348/734 |
| 2013/0082826 | A1 | 4/2013 | Chandra et al. | |
| 2015/0032456 | A1* | 1/2015 | Wait | ........................ G10L 15/26 704/275 |
| 2016/0150031 | A1* | 5/2016 | Knowles | ............... H04L 67/303 709/223 |

FOREIGN PATENT DOCUMENTS

| | | |
|---|---|---|
| CN | 101336527 A | 12/2008 |
| CN | 102938717 A | 2/2013 |

\* cited by examiner

DEVICE IN HOME NETWORK AND METHOD FOR EXECUTING INSTRUCTION IN HOME NETWORK

RELATED APPLICATIONS

This application is a U.S. National Stage filing under 35 U.S.C. § 371 of international patent cooperation treaty (PCT) application No. PCT/CN2013/088934, filed Dec. 10, 2013, and entitled "DEVICE IN HOME NETWORK AND METHOD FOR EXECUTING INSTRUCTION IN HOME NETWORK," which claims priority to the Chinese Patent Application No. 201310373768.9, filed with the Chinese Patent Office on Aug. 23, 2013 and entitled "DEVICE IN HOME NETWORK AND METHOD FOR EXECUTING INSTRUCTION IN HOME NETWORK", which applications are hereby incorporated herein by reference in their respective entireties.

TECHNICAL FIELD

The subject application relates to the field of networks, and in particular, to a device in a home network and a method for executing an instruction in a home network.

BACKGROUND

More and more intelligent devices are used in modern homes, and it becomes reality to construct a home network among the devices in a wireless or wired manner. A user can release an instruction to the devices in the network to complete a task assigned by the user.

In such a network, different devices have different device functions. For example, an intelligent robot has functions that a smart phone does not have, and a refrigerator has a refrigeration function while a microwave oven does not. In addition, devices with similar functions have different device features, for example, a smart phone and a personal computer (PC) have different computation processing capacities, and a smart TV and a tablet computer have different screen sizes and different resolution, and support different file formats. In this case, how to make full use of the functions and features of the devices in the home network and use the most appropriate device to execute the user instruction so as to provide best user experience for users becomes an issue worth considering.

Using multimedia playback as an example, Digital Living Network Alliance (DLNA) has become an option to play multimedia, in which household appliances are connected to the same router in access manners such as wireless fidelity (Wi-Fi) and local area network (LAN) to form a LAN, and devices in the LAN can function as a multimedia playback controller. However, the DLNA mainly focuses on issues such as interconnection between devices, file format conversion, and bit rate conversion, and does not focus on user requirement-based device selection; moreover, the DLNA only applies to the multimedia playback device network, and cannot be adapted to a home network environment consisting of multiple functional devices.

SUMMARY

Accordingly, an objective of the subject application is to make full use of functions and features of devices in a home network and use a most appropriate device to execute an instruction, so as to provide best user experience for users.

According to an aspect of the subject application, a method for executing an instruction in a home network is provided, and the method includes:

an obtaining step, in which a first device in the home network obtains the instruction;

a query step, in which the first device queries for at least one particular device meeting a predetermined condition in the home network; and a notification step, in which the first device notifies the particular device of the instruction.

According to another aspect of the subject application, a device in a home network is further provided, and the device includes:

an obtaining unit, used for obtaining an instruction;

a query unit, used for: when the instruction is obtained, querying for at least one particular device meeting a predetermined condition in the home network; and a notification unit, used for notifying the particular device of the instruction.

According to another aspect of the subject application, a method for executing an instruction in a home network is further provided, and the method is executed by a device in the home network and includes:

obtaining the instruction;

querying for at least one particular device meeting a predetermined condition in the home network; and notifying the particular device of the instruction.

According to another aspect of the subject application, a computer program product is provided, and the computer program product is used for enable a device in a home network to execute the method in the subject application.

According to another aspect of the subject application, a computer readable medium is further provided, where the computer readable medium includes a computer operating instruction, and when a processor executes the computer operating instruction, the computer operating instruction is used for enabling the processor to execute the method in the subject application.

According to another aspect of the subject application, a device in a home network is further provided, where the device includes a processor, a memory, and a communications interface; the memory stores a computer operating instruction; the processor, the memory, and the communications interface are connected through a communication bus; and when the device runs, the processor executes the computer operating instruction stored by the memory, so that the device executes the method in the subject application.

According to a technical solution of the subject application, a user does not need to directly send an instruction to a particular device that executes the instruction; instead, the user only needs to make sure that any device in the home network obtains the instruction. The user can enable a most suitable device to execute the instruction automatically without knowing a large amount of detailed information such as device performance. Therefore, the subject application not only makes full use of functions and features of devices in the home network, but also significantly facilitates user operations and provides best user experience for users.

DETAILED DESCRIPTION

The following describes the specific implementation manners of the subject application in further details with reference to the accompanying drawings and embodiments. The following embodiments are used for describing the subject application, but are not intended to limit the scope of the subject application.

To make full use of functions and features in devices in a home network and use a most appropriate device to execute an instruction, the subject application provides a technology for executing an instruction in a home network. In the technology, a user can send any instruction to any device in the home network, and a device obtaining the instruction can search the home network for a particular device that is suitable for executing the instruction and notify the particular device. In this manner, the user does not need to directly send an instruction to a particular device that executes the instruction; instead, the user only needs to make sure that any device in the home network obtains the instruction. The user can enable a most suitable device to execute the instruction automatically without knowing a large amount of detailed information such as device performance. Therefore, the subject application not only makes full use of functions and features of devices in the home network, but also significantly facilitates user operations and provides best user experience for users.

In the subject application, in a broad sense, the "home network" is construed as a small-size network information platform constructed by multiple devices connected in a wired or wireless manner, so as to implement information management and sharing among multiple devices. The "home" is merely used for describing features such as small range and privacy of the information platform, but the information platform is not limited to usage in homes; the home network in the subject application can also be applied to many environments such as enterprises and small-size public places.

In the subject application, in a broad sense, the "instruction" is construed as a trigger event for a device function in the home network. The instruction may be a real-time user instruction, such as a command for playing a video sent by the user; the instruction may also be a preset instruction, such as hourly chime; and the instruction may also be an accidental emergency, such as an access control system function triggered by an intruding outsider. The instruction may also be directly from the user, another device in the home network, or a device or system outside the home network.

In the subject application, the "device" in the home network refers to any device that may be interconnected in the home network, which may be a control device, such as a home gateway, in the home network, and may also be a specific functional device, such as a smart TV, in the home network. These devices may have a home network connection function on their own, like a smart phone, and it is also possible that the device is attached with a network connection functional module, like a water meter. In the subject application, the device in the home network includes, but is not limited to: a home gateway, a wireless router, a modem, a smart TV, a smart phone, a refrigerator, a washing machine, a microwave oven, a PC, a notebook computer, a tablet computer, a sounder, a cleaner, a heater, an air conditioner, a kitchen range, a dish washer, a clock, a printer, a scanner, a projector, a camera, a video camera, a lighting device, a monitoring device, an access control device, a water meter, an electricity meter, a gas meter, and so on.

A person skilled in the art can understand that terminologies such as the "first" and "second" in the subject application are merely used for distinguishing different steps, devices, or modules, which neither represent any specific technical content nor represent their necessary logic sequences.

Figure 1:
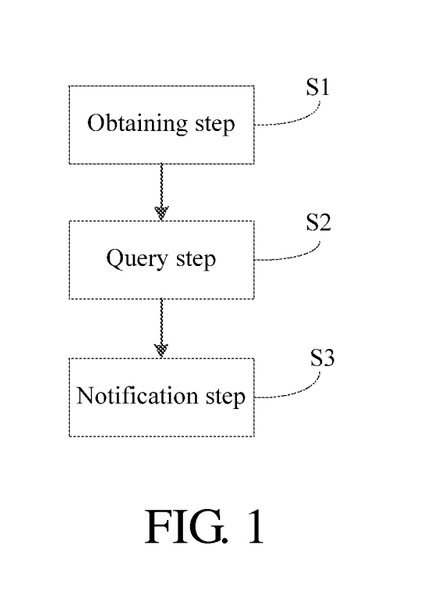
FIG. 1 is a flowchart of a method for executing an instruction in a home network in a specific implementation manner of the subject application.

An embodiment of the subject application provides a method for executing an instruction in a home network. As shown in FIG. 1, the method includes the following steps: S1: an obtaining step, in which a first device in the home network obtains the instruction; S2: a query step, in which the first device queries for at least one particular device meeting a predetermined condition in the home network; and S3: a notification step, in which the first device notifies the particular device of the instruction. The steps of the method in the specific implementation manner of the subject application are described in detail in the following with reference to the accompanying drawings.

S1: An obtaining step, in which a first device in the home network obtains the instruction.

The first device may be any device in the home network, which may be a functional device that ultimately executes the instruction or only function as a relay device of the instruction. In the obtaining step, the first device may obtain the instruction in many manners.

In an embodiment of the obtaining step, the first device may receive the instruction. In this case, the instruction may be directly sent by the user to the first device and received by the first device, for example, through a remote controller signal, a voice instruction, and an action instruction; the instruction may also be sent by another device in the home network and received by the first device, for example, the loop execution of the method of the subject application described in the following; and the instruction may also be remotely sent by a user or device outside the home network and received by the first device.

In another embodiment of the obtaining step, in addition to receiving the instruction in a passive manner, the first device may also obtain the instruction proactively. In this case, the instruction may be instruction content shared by another device in the home network; the first device may read the instruction in a storage space of another device, or the first device may obtain an instruction storage address outside the home network and then access the storage address to read the instruction content.

S2: A query step, in which the first device queries for at least one particular device meeting a predetermined condition in the home network.

In a technology of the subject application, a key inventive point lies in that a particular device suitable for executing the instruction can be automatically found in the home network, making it possible for the particular device to execute the instruction subsequently. The "predetermined condition" mentioned in the query step is a criterion for determining a particular device suitable for executing the instruction, where the predetermined condition may be preset by a person skilled in the art according to a requirement, and it may be associated with functions and features of the device, an instruction execution history of each device, and so on, which will be described in detail with reference to subsequent specific embodiments.

In an embodiment of the query step, the particular device that the first device queries for is an optimal device having an optimal effect in executing the instruction in the home network, that is, the predetermined condition for querying for the particular device is the optimal effect in executing the instruction in the home network. In this way, the user can enable a device having an optimal effect in executing the instruction in the home network to execute the instruction automatically by enabling any device in the home network to obtain the instruction, thereby not only making full use of functions and features of devices in the home network, but also significantly facilitating user operations, hence providing best user experience for users.

The automatic execution of the query step in the subject application depends on an objective evaluation system that performs judgment based on the predetermined condition, rather than subjective judgment of the user. In the subject application, instruction execution effects can be compared according to a Device Capability Table (DCT), so as to find the optimal device.

The DCT at least includes content fields such as a device name/number, a device attribute, and a device attribute value; the user may further set other content fields, such as remark information, according to a requirement thereof. The device name/number represents each device currently connected in the home network, and may be represented by a device name and/or device number, for example, first smart TV/A1, smart phone/B, refrigerator/C, and so on, where device names are usually in one-to-one correspondence with device numbers. The device attribute represents a function or feature of each device in the home network, for example, a device screen size, device screen resolution, a 3D display function, a refrigeration function, a device location, whether the device is available currently, and so on. The device attribute value represents a specific value of the device attribute. Value properties corresponding to device attributes of different properties are different, for example, the device screen size corresponds to a value range from 4.7 inches to 100 inches; the screen resolution of the device corresponds to values such as 1024×768 and 4096×3072; the 3D function corresponds to Boolean values of 1/0, where 1 indicates that the device has the function and 0 indicates that the device does not have the function; and the device location corresponds to specific location information such as living room, bedroom, kitchen, and so on. The following Table 1 shows an example of the DCT in an embodiment of the subject application:

TABLE 1

| Device name/number | Device attribute | Device attribute value |
|---|---|---|
| First smart TV/A1 | Video playback capability | 1 |
| First smart TV/A1 | Device screen size | 55 inches |
| First smart TV/A1 | 3D display function | 1 |
| First smart TV/A1 | Device location | Living room |
| First smart TV/A1 | Whether it is available currently | 1 |

TABLE 1-continued

| Device name/number | Device attribute | Device attribute value |
|---|---|---|
| First smart TV/A1 | Refrigeration function | 0 |
| Smart phone/B | Video playback capability | 1 |
| Smart phone/B | Device screen size | 4.7 inches |
| Smart phone/B | 3D display function | 0 |
| Smart phone/B | Device location | Bedroom |
| Smart phone/B | Whether it is available currently | 1 |
| Smart phone/B | Refrigeration function | 0 |
| Refrigerator/C | Refrigeration function | 1 |
| Refrigerator/C | Device location | Kitchen |
| Refrigerator/C | Audio playback capability | 0 |
| Refrigerator/C | Whether it is available currently | 0 |
| . . . | . . . | . . . |

It can be known from the information in Table 1 that each device may correspond to multiple device attributes in the DCT, and each device attribute of each device corresponds to a current device attribute value in the DCT. A person skilled in the art can understand that some device attributes are inherent attributes of the device, and the device attribute values thereof do not change, for example, the device screen size of smart phone/B, the 3D display function, and so on. Meanwhile, some device attributes may change along with different states of the device, so that the DCT is updated in real time, and therefore, in the query step, the particular device meeting the predetermined condition can be constantly queried for according to the latest DCT. For example, after the first smart TV/A1 is powered on, the device attribute value of the device attribute "whether it is available currently" is updated to 1 from 0; after the smart phone/B is moved from the bedroom to the living room, the device attribute value of the device attribute "device location" is updated from "bedroom" to "living room". A person skilled in the art can understand that the detection on these state changes and the update of the DCT can be implemented by means of conventional technologies in the art.

In this embodiment, the first device determines the optimal device based on the foregoing DCT. In a simple example, when obtaining an instruction of "playing a common video", the first device queries the foregoing DCT, and finds that the first smart TV/A1 and the smart phone/B have a video playback capability, but the first smart TV/A1 has a larger device screen size than the smart phone/B, and in this case, the first smart TV/A1 can be regarded as having an optimal effect in playing a common video, and therefore is determined as the optimal device.

A person skilled in the art can understand that, during comparison of the instruction execution effects, judgment needs to be performed by comprehensively considering multiple device attributes of each device in the DCT. In these device attributes, some are absolute conditions for evaluating the execution effect, for example, if the instruction is playing a video, the attribute values of the device attributes "video playback capability" and "whether it is available currently" are both 1, and these conditions should be satisfied before the execution effect is evaluated. Impacts of some device attributes on the execution effect are relative, for example, it is possible that the device screen size of the first smart TV is larger than that of the second smart TV while the sound effect of the second smart TV is better than that of the first smart TV, and at this time, the execution effect should be judged by comprehensively considering multiple factors. In this case, a person skilled in the mart may use an evaluation method in the prior art to perform the comprehensive judgment. For example, different weights are assigned to the device attributes in the DCT, and a comprehensive evaluation result of execution effects is obtained by taking the weights into consideration, so that the optimal device having an optimal effect in executing the instruction is found in this embodiment.

In this embodiment, the DCT may be stored in the home network, and may also be stored outside the home network. When stored in the home network, the DCT may be stored in each device of the home network and kept synchronized, and in this way, any device can access the DCT stored therein, and the DCT is convenient to use; the DCT may also be stored in a network central device of the home network, for example, a home gateway or several specific devices, and in this way, storage spaces of other devices are saved. When stored outside the home network, the DCT may be stored in one or more external devices connected to the home network, for example, a remote server or even cloud, so that the first device can read and query the DCT.

In this embodiment, the first device queries for an optimal device having an optimal effect in executing the instruction in the home network, and the query operation may have several different results. When the optimal device is a device other than the first device in the home network, the first device may continue to perform the subsequent notification step in the subject application to notify the optimal device of the instruction, so that the optimal device has a chance of executing the user instruction. When the first device finds that the optimal device is the first device itself, it indicates that the first device is the optimal device having an optimal effect in executing the instruction in the home network, and in this case, the instruction is executed by the first device. When the first device does not find any optimal device, that is, when the home network does not have any device capable of executing the instruction, the home network does not execute the instruction, and at the same time, in response to the instruction, a device, such as the first device, a network central device, or a certain specified device, in the home network may generate a message for recording and illustrating that the instruction is not executed.

In another embodiment of the query step, the particular device that the first device queries for is a second device having a better effect in executing the instruction than the first device in the home network, that is, the predetermined condition for querying for the particular device is that the effect in executing the instruction in the home network is better than that of the first device. In this way, the user can enable a device having a better effect in executing the instruction in the home network to execute the instruction automatically by enabling any device in the home network to obtain the instruction, thereby not only making full use of functions and features of devices in the home network, but also significantly facilitating user operations, hence providing best user experience for users.

Judgment is also performed based on the instruction execution effect, and therefore, similar to the foregoing embodiment, this embodiment may compare the instruction execution effects according to a DCT, so as to find the second device. The DCT at least includes content fields such as a device name/number, a device attribute, and a device attribute value; the user may further set other content fields according to a requirement thereof. The DCT may be stored in the home network, and may also be stored outside the home network.

In this embodiment, the first device queries for a second device having a better effect in executing the instruction than the first device in the home network, and the query operation may have several different results. When the first device finds that there is only one second device having a better execution effect than the first device, the first device may continue to perform the subsequent notification step in the subject application to notify the second device of the instruction, so that the second device has a chance of executing the user instruction. When the first device does not find any second device having a better execution effect than the first device, it indicates that the home network does not have any other device having a better execution effect than the first device, and at this time, the instruction is executed by the first device. However, at this time, the first device may also fail to execute the instruction, and the reason may be that the first device is currently in an unavailable state, and may also be that the first device is incapable of executing the instruction. In this case, the home network does not execute the instruction, and at the same time, in response to the instruction, a device, such as the first device, a network central device, or a certain specified device, in the home network may generate a message for recording and illustrating that the instruction is not executed. In addition, there is a special query result, that is, the first device finds that there are multiple devices having a better execution effect than the first device, and at this time, the number of second devices is more than one. In this case, the first device may continue to execute the subsequent notification step of the subject application to notify the multiple second devices of the instruction at the same time. A person skilled in the art can understand that, each device in the home network can perform the method in this embodiment, and therefore, multiple second devices obtaining the instruction may continue to query for other devices having a better execution effect than the second devices. In this way, the method in this embodiment can be subject to loop execution in the home network, and the final execution result is similar to that of the foregoing embodiment, that is, the instruction is ultimately executed by a device having an optimal effect in executing the instruction in the home network. Definitely, when multiple second devices exist, a device list of these second devices may be provided so that the user can make a choice. The user may select one or more of these second devices to continue to perform possible subsequent operations.

A history of instruction execution in the home network may include many aspects of information such as user habits and device features. Therefore, in another embodiment of the query step, reference may be made to history information of instruction execution in the home network to determine the particular device that the first device queries for, and at this time, the predetermined condition may be, for example, a device that executes an instruction of a same type last time, or a device that executes an instruction of a same type for the most number of times in a certain period of time, or a device that executes an instruction of a same type for the most number of times in a certain space. In this way, the user can enable a device, which is determined according to the history information, most suitable for executing the instruction in the home network to execute the instruction automatically by enabling any device in the home network to obtain the instruction, thereby not only fully considering factors such as user habits, but also making full use of functions and features of devices in the home network, thereby significantly facilitating user operations, and providing best user experience for users.

In this embodiment, according to different predetermined conditions, the particular device may be queried for based on a Device Log (DL). Each record in the device log is an instruction execution result in the home network, and each record at least includes information such as instruction content of an instruction executed each time in the home network, a device name/number, an instruction execution time, and an instruction execution location; the user may further set other content fields, such as remark information, according to a requirement thereof. The instruction content represents specific instruction information received by a device in the home network, and it usually only describes an operation executed but does not specify a device for executing the instruction. The device name/number represents a device that executes the instruction in the home network, and can be represented by a device name and/or a device number. The instruction execution time and the instruction execution location separately represent specific time information and specific location information for executing the instruction. Similar to the DCT described in the foregoing, the DL may be stored in the home network, and may also be stored outside the home network.

The following Table 2 shows an example of the DL in an embodiment of the subject application:

TABLE 2

| Instruction content | Device name/number | Instruction execution time | Instruction execution location | Remark information |
|---|---|---|---|---|
| Play a common video | Smart phone/B | 8-15 19:32 | Bedroom | |
| Play audio | First sounder/D1 | 8-16 20:01 | Bedroom | |
| Play a 3D video | First smart TV/A1 | 8-17 20:15 | Living room | |
| Print a file | | | | Not executed |
| Play audio | Second sounder/D2 | 8-18 16:15 | Living room | |
| Wash dishes | Dishwasher/E | 8-20 13:00 | Kitchen | |
| Play audio | First sounder/D1 | 8-20 15:47 | Bedroom | |
| Print a file | Printer/F | 8-21 9:10 | Study | |
| . . . | . . . | . . . | . . . | . . . |

It can be know from the information of Table 2 that, each record in the DL is an instruction execution result in the home network, where for an instruction executed successfully, information, such as a name/number of a device that executes the instruction, an execution time, and an execution location, is recorded, while for an instruction that fails to be executed due to different reasons, a mark is given in the remark information.

In this embodiment, when the first device queries for the particular device meeting the predetermined condition, the first device queries the foregoing DL according to the obtained instruction content to determine the suitable particular device. For example, when the instruction content is "play a 3D video" and the predetermined condition is "a device that executes an instruction of a same type last time", the first device finds that the device which executes the instruction of playing a 3D video last time is the first smart TV/A1 by querying the DL, and therefore determines the first smart TV/A1 as the particular device. When the instruction content is "play audio" and the predetermined condition is "a device that executes an instruction of a same type for the most number of times in last month", the first device finds that the device which plays audio for the most number of times in last month is the first sounder/D1 by querying the DL, and therefore determines the first sounder/D1 as the particular device.

In this embodiment, the first device queries for the particular device meeting the predetermined condition in the home network by referring to the DL, and the query operation may have several different results. When the particular device is a device other than the first device in the home network, the first device may continue to perform the subsequent notification step in the subject application to notify the particular device of the instruction, so that the particular device has a chance of executing the user instruction. When the first device finds that the particular device is the first device itself, it indicates that the first device is the particular device meeting the predetermined condition in the home network, and in this case, the instruction is executed by the first device. When the first device does not find any particular device meeting the predetermined condition after querying the DL, the home network does not execute the instruction, and at the same time, in response to the instruction, a device, such as the first device, a network central device, or a certain specified device, in the home network may generate a message for recording and illustrating that the instruction is not executed. In addition, there is a special query result, that is, the first device finds that there are multiple devices meeting the predetermined condition, and at this time, the number of particular devices is more than one. In this case, the first device may further refer to the DCT described in the foregoing embodiment to determine, among the multiple particular devices, a device having an optimal effect or a better effect in executing the instruction as a final particular device. The specific execution method is the same as that described in the foregoing embodiment. Definitely, when multiple particular devices are found, a device list of these particular devices may be provided so that the user can make a choice. The user may select one or more of these particular devices to continue to perform possible subsequent operations.

S3: A notification step, in which the first device notifies the particular device of the instruction.

In the notification step, the first device may notify the particular device of the instruction in many manners. For example, the first device may directly send the instruction to the particular device; or, the first device may share, through the home network, the instruction stored in the first device with the particular device, and then the particular device may read a storage space of the first device; or, the first device may notify the particular device of a storage location of the instruction, and then the particular device may access the storage location to obtain the instruction.

Among various instructions in the home network, some instructions can be executed relying on functions of the devices, for example ON/OFF of a lighting device, and refrigeration of a refrigerator. However, execution of some instructions requires execution devices to have corresponding additional information, for example, playback of multimedia content requires the execution device to obtain the corresponding multimedia content. In the notification step, when the instruction is playing a piece of multimedia content, the first device may further notify the particular device of the multimedia content in many manners. For example, the first device may directly send the multimedia content to the particular device; or, the first device may share, through the home network, the multimedia content stored in the first device with the particular device, and then the particular device may read a storage space of the first device; or, the first device may notify the particular device of a storage location of the multimedia content, and then the particular device may access the storage location to obtain the multimedia content. A person skilled in the art can understand that the multimedia content may include many forms, including pictures, audio, and video.

A person skilled in the art may understand that, in the foregoing method according to the specific implementation manner of the subject application, the serial numbers of the steps do not indicate the sequence for executing the steps, and the sequence for executing the steps should be determined according to functions and internal logics thereof, but should not limit an implementation process of the specific implementation manner of the subject application.

In addition, an embodiment of the subject application further provides a computer readable medium which includes a computer readable instruction that performs the following operations when being executed: operations of Step S1, Step S2, and Step S3 in the method of the implementation manner shown in FIG. 1.

Figure 2:
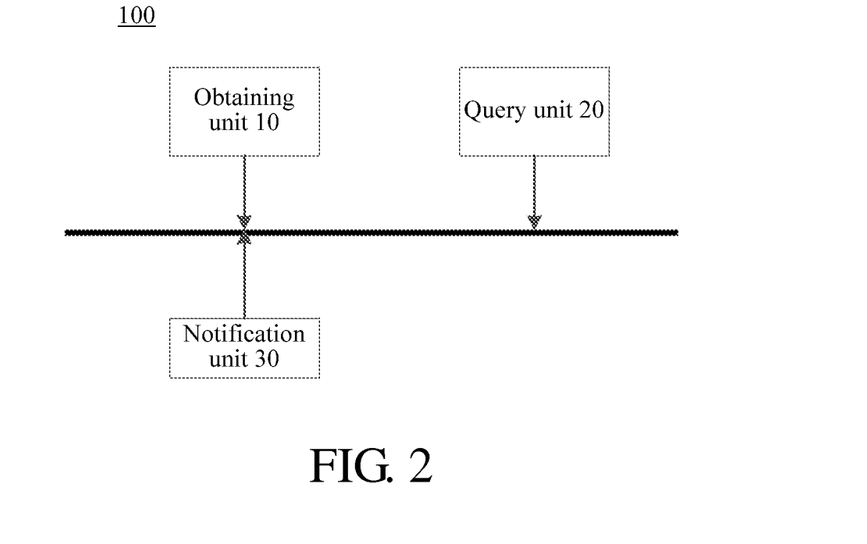
FIG. 2 is a system structural diagram of a device in a home network in a specific implementation manner of the subject application.

A specific implementation manner of the subject application provides a device 100 in a home network, where the device may be any device interconnected in the home network, which may be a functional device that ultimately executes the instruction, and may also merely function as a relay device of the instruction; the device includes, but is not limited to: a home gateway, a wireless router, a modem, a smart TV, a smart phone, a refrigerator, a washing machine, a microwave oven, a PC, a notebook computer, a tablet computer, a sounder, a cleaner, a heater, an air conditioner, a kitchen range, a dish washer, a clock, a printer, a scanner, a projector, a camera, a video camera, a lighting device, a monitoring device, an access control device, a water meter, an electricity meter, a gas meter, and so on.

As shown in FIG. 2, the device 100 includes: an obtaining unit 10, used for obtaining an instruction; a query unit 20, used for: when the instruction is obtained, querying for a particular device meeting a predetermined condition in the home network; and a notification unit 30, used for notifying the particular device of the instruction. The function of each unit of the foregoing device in the specific implementation manner of the subject application is described in detail in the following with reference to the accompanying drawings.

(1) The obtaining unit 10 is used for obtaining an instruction.

The obtaining unit 10 may obtain the instruction in many manners. In an embodiment, the obtaining unit 10 may receive the instruction. In this case, the instruction may be directly sent by a user to the first device and received by the obtaining unit 10, for example, through a remote controller signal, a voice instruction, and an action instruction; the instruction may also be sent by another device in the home network and received by the obtaining unit 10; and the instruction may also be remotely sent by a user or device outside the home network and received by the obtaining unit 10. In another embodiment, the obtaining unit 10 may obtain the instruction proactively. In this case, the instruction may be instruction content shared by another device in the home network; the obtaining unit 10 may read the instruction in a storage space of another device, or the obtaining unit 10 may obtain an instruction storage address outside the home network and then access the storage address to read the instruction content.

(2) The query unit 20 is used for: when the instruction is obtained, querying for a particular device meeting a predetermined condition in the home network.

Corresponding to some specific embodiments of the method for executing an instruction in a home network described in the foregoing, the query unit 20 may query for the particular device in the home network according to different predetermined conditions. In an embodiment, the query unit 20 may query for an optimal device having an optimal effect in executing the instruction in the home network according to a DCT, so as to use the optimal device as the particular device. In another embodiment, the query unit 20 may query for a second device having a better effect in executing the instruction than the first device in the home network according to a DCT, so as to use the second device as the particular device. In another embodiment, the query unit 20 may query for a device that executes an instruction of a same type last time, or a device that executes an instruction of a same type for the most number of times in a certain period of time, or a device that executes an instruction of a same type for the most number of times in a certain space according to a DL and/or a DCT, so as to use the device as the particular device.

Figure 3:
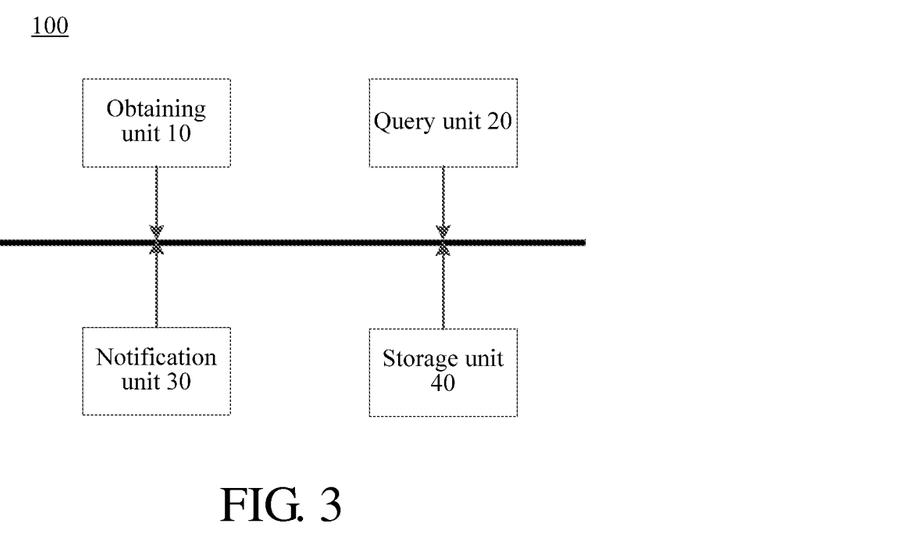
FIG. 3 is another system structural diagram of a device in a home network in a specific implementation manner of the subject application.

The DL and/or DCT may be stored in the home network, and may also be stored outside the home network. When the DL and/or DCT is stored in the device 100 of the home network, as shown in FIG. 3, the device 100 may further include a storage unit 40, used for storing the DL and/or the DCT.

Figure 4:
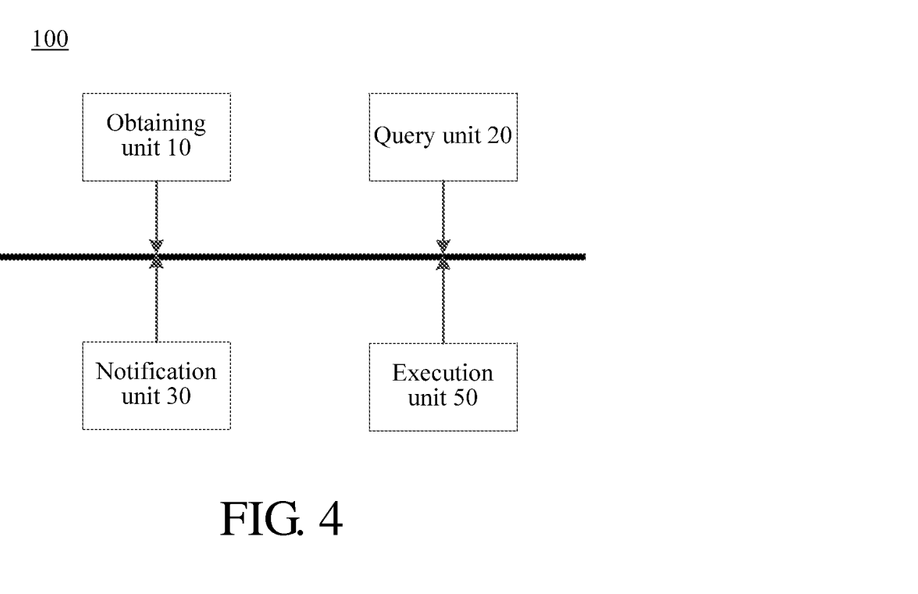
FIG. 4 is another system structural diagram of a device in a home network in a specific implementation manner of the subject application.
Figure 5:
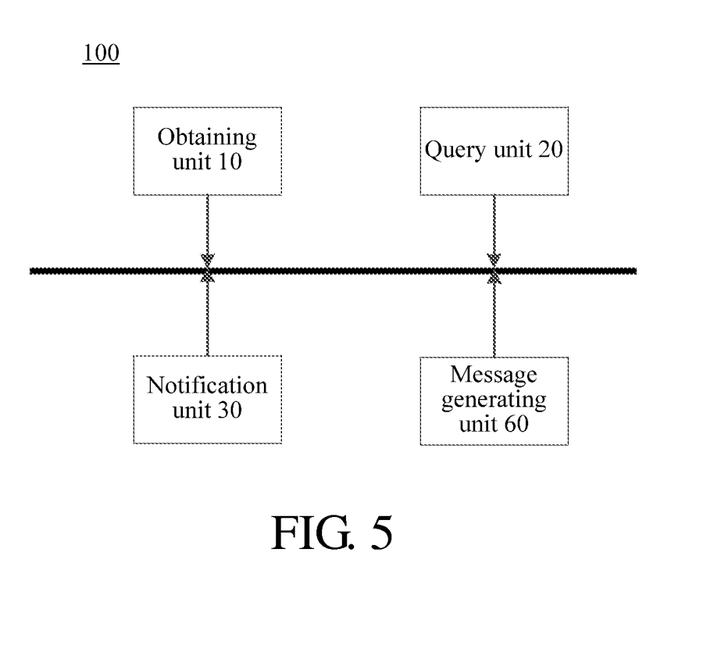
FIG. 5 is another system structural diagram of a device in a home network in a specific implementation manner of the subject application.

The query unit 20 queries for the particular device meeting the predetermined condition in the home network, and the query operation may have several different results. When the particular device is a device other than the device 100 in the home network, the notification unit 30 of the device 100 may continue to perform the subsequent operation in the subject application to notify the particular device of the instruction, so that the particular device has a chance of executing the user instruction. When it is found that the particular device is the device 100, it indicates that the device 100 is the particular device meeting the predetermined condition in the home network, and as shown in FIG. 4, in this case, the device 100 may further include an execution unit 50 used for executing the instruction. If no particular device meeting the predetermined condition is found after the query, the home network does not execute the instruction, and at the same time, as shown in FIG. 5, in response to the instruction, the device may further include a message generating unit 60, used for generating a message for recording and illustrating that the instruction is not executed.

(3) The notification unit 30 is used for notifying the particular device of the instruction.

The notification unit 30 may notify the particular device of the instruction in many manners. For example, the notification unit 30 may directly send the instruction to the particular device; or, the notification unit 30 may share, through the home network, the instruction stored in the device 100 with the particular device, and then the particular device may read a storage space of the device 100; or, the notification unit 30 may notify the particular device of a storage location of the instruction, and then the particular device may access the storage location to obtain the instruction.

When the instruction is playing a piece of multimedia content, the notification unit 30 may further notify the particular device of the multimedia content in many manners. For example, the notification unit 30 may directly send the multimedia content to the particular device; or, the notification unit 30 may share, through the home network, the multimedia content stored in the device 100 with the particular device, and then the particular device may read a storage space of the device 100; or, the notification unit 30 may notify the particular device of a storage location of the multimedia content, and then the particular device may access the storage location to obtain the multimedia content.

A person skilled in the art can understand that the multimedia content may include many forms, including pictures, audio, and video.

Figure 6:
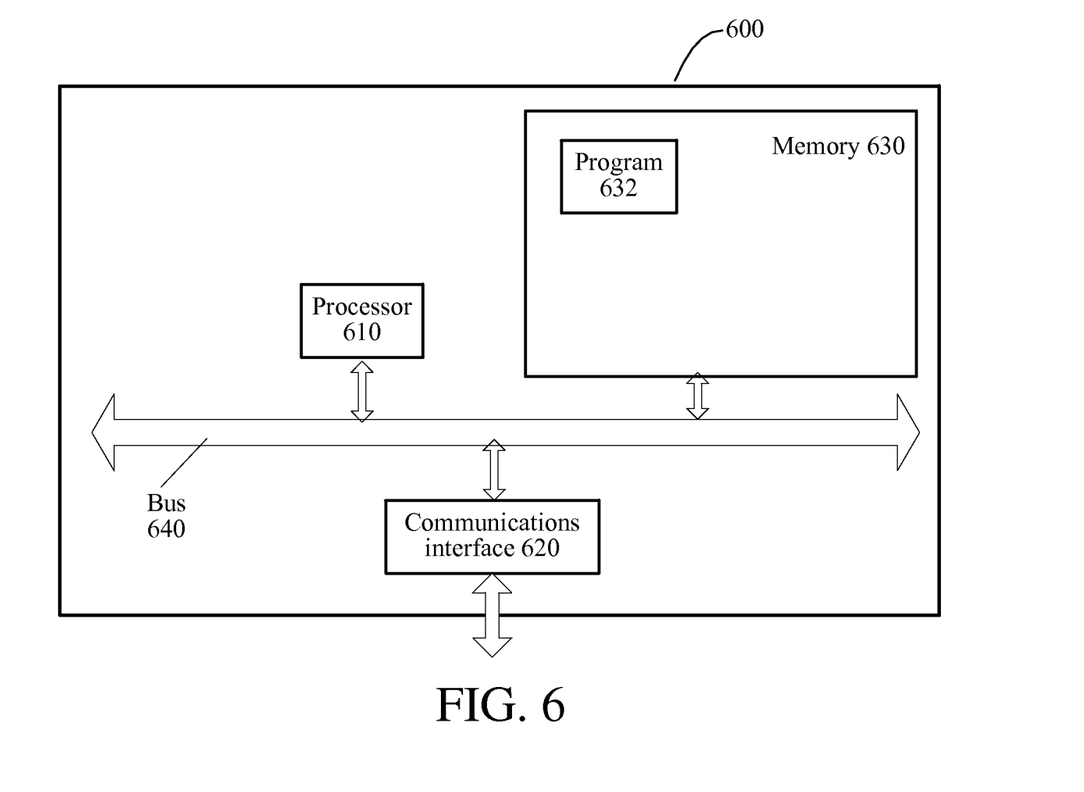
FIG. 6 is another system structural diagram of a device in a home network in a specific implementation manner of the subject application.

FIG. 6 is a schematic structural diagram of a device 600 in a home network provided in a specific implementation manner of the subject application, and the method of this specific implementation manner does not limit the specific implementation of the device 600. As shown in FIG. 6, the device 600 may include:

a processor 610, a communications interface 620, a memory 630, and a communication bus 640, where:

the processor 610, the communications interface 620, and the memory 630 communicate with each other through the communication bus 640.

The communications interface 620 is used for communication with network elements such as a client.

The processor 610 is used for executing a program 632, which can specifically implement related functions of the device in the specific implementation manner shown in FIG. 2 to FIG. 5.

Specifically, the program 632 may include program code, and the program code includes a computer operating instruction.

The processor 610 may be a central processing unit (CPU), or an Application Specific Integrated Circuit (ASIC), or may be configured as one or more integrated circuits for implementing an embodiment of the subject application.

The memory 630 is used for storing the program 632. The memory 630 may include a high-speed random access memory (RAM), and may also include a non-volatile memory, for example, at least one disk memory. The program 632 specifically may enable the device 600 to execute the following steps:

obtaining an instruction;

querying for at least one particular device meeting a predetermined condition in the home network; and notifying the particular device of the instruction.

For specific implementation of each step in the program 632, reference may be made to the description in a corresponding step or unit in the foregoing embodiments, and description is not repeated herein. A person of ordinary skill in the art may realize that, the units and method steps of examples described in embodiments disclosed in the present specification can be implemented by electronic hardware, or a combination of computer software and electronic hardware. Whether these functions are implemented as hardware or software depends upon the particular application and design constraint conditions of the technical solution. A person skilled in the art can use different methods to implement the described functions for each particular application, but such implementation should not be regarded as going beyond the scope of the subject application.

If implemented in the form of software functional units and sold or used as an independent product, the functions may also be stored in a computer readable storage medium. Based on such understanding, the technical solution of the subject application or the part that makes contributions to the prior art can be substantially embodied in the form of a software product. The computer software product may be stored in a storage medium and include several instructions for instructing computer equipment (for example, a personal computer, a server, or network equipment) to perform all or a part of steps of the method according to embodiments of the subject application. The foregoing storage medium includes: any medium that can store program code, such as a USB flash disk, a removable hard disk, a read-only memory (ROM), a random access memory (RAM), a magnetic disk, or an optical disc.

The foregoing implementation manners are merely used for describing the subject application rather than limiting the subject application. A person of ordinary skill in the art may make various variations without departing from the spirit and scope of the subject application, and all the equivalent technical solutions also belong to the scope of the subject application. The patent scope of the subject application shall be subject to the claims.

What is claimed is:

1. A method, comprising:
obtaining, by a first device of a home network comprising a processor, an instruction to be executed to perform a function in an environment in which the home network is installed;
querying, by the first device according to a device capability table (DCT), for at least one device of the home network that is determined to meet a predetermined condition associated with performing the function in the environment in which the home network is installed, wherein the at least one device is at least one optimal device having an optimal effect associated with performing the function; and
in response to the at least one optimal device being determined not to comprise the first device, providing, by the first device, a notification of the instruction to the at least one optimal device that initiates the at least one optimal device to execute the instruction, and in response to the at least one optimal device being determined to comprise the first device, executing, by the first device, the instruction,
wherein the at least one device comprises a second device that has previously executed another instruction having the same instruction type as the instruction for another most number of times in a defined space of the environment.

2. The method of claim 1, wherein, in response to a determination that there is no device capable of executing the instruction in the home network, generating, by a network device of the home network, a message to record that the instruction is not executed.

3. The method of claim 1, wherein the at least one device comprises at least one third device having a better effect associated with the performing of the function than the first device.

4. The method of claim 3, further comprising, in response to a determination that multiple third devices comprising the at least one third device are found in the query, selecting at least one of the multiple third devices.

5. The method of claim 3, further comprising, in response to a determination that the first device has not found the at least one third device having the better effect associated with the performing of the function than the first device, selecting the first device as one of the at least one optimal device.

6. The method of claim 1, wherein the DCT comprises:
a device name field or a device number field, a device attribute field, and a device attribute value field.

7. The method of claim 1, wherein the DCT is stored in at least one network device in the home network, or stored by an external device outside the home network.

8. The method of claim 1, wherein the first device queries for the at least one device according to a device log (DL).

9. The method of claim 8, wherein content of the DL comprises instruction content each time instructions are executed in the home network, a device name or a device number, an instruction execution time, and an instruction execution location.

10. The method of claim 8, wherein the DL is stored in at least one network device in the home network, or stored by an external device outside the home network.

11. The method of claim 1, wherein the instruction is a direction to play multimedia content, and the notifying comprises:
sending the multimedia content from the first device to the at least one optimal device, sharing the multimedia content with the at least one optimal device through the home network, or notifying the at least one optimal device of a storage location of the multimedia content.

12. The method of claim 1, wherein the notifying comprises sending the instruction by the first device to the at least one optimal device, sharing the instruction with the at least one optimal device via the home network, or notifying the at least one optimal device of a storage location of the instruction so as to notify the at least one device of the instruction.

13. The method of claim 1, wherein the obtaining comprises the first device receiving the instruction, or reading the instruction stored at a storage location.

14. A device, comprising:
a processor; and
a memory, coupled to a processor, that stores executable instructions that, when executed by the processor, facilitate performance of operations, comprising:
obtain an instruction to be executed to perform a function in an environment in which a home network is installed, wherein the device is communicatively coupled to the home network;
in response to the instruction being obtained, query, according to a device capability table (DCT), for at least one particular device of the home network meeting a defined condition associated with performance of the function in the environment in which the home network is installed, wherein the at least one particular device is at least one optimal device having an optimal effect associated with the performance of the function;
in response to the at least one optimal device being determined not to comprise the device itself, provide a notification of the instruction to the at least one optimal device that initiates the at least one optimal device to execute the instruction; and
in response to finding that the at least one optimal device comprises the device itself, execute the instruction,
wherein the at least one particular device comprises a second device that has previously executed another instruction having the same instruction type as the instruction for another most number of times in a defined space of the environment.

15. The device of claim 14, wherein the operations further comprise, in response to the instruction being obtained, query for at least one third device having a better effect associated with the performance of the function than the device in the home network, and includes the third device in the at least one particular device.

16. The device of claim 14, wherein the device further comprises a storage unit used for storing the DCT.

17. The device of claim 14, wherein the operations further comprise, in response to not finding any of the at least one particular device meeting the defined condition, generate a message for recording that the instruction is not executed.

18. The device of claim 14, wherein the instruction is an instruction to play multimedia content, and the operations further comprise send the multimedia content to the at least one optimal device, share the multimedia content with the at least one optimal device through the home network, or notify the at least one optimal device of a storage location of the multimedia content.

19. The device of claim 14, wherein the operations further comprise send the instruction to the at least one optimal device, share the instruction with the at least one optimal device through the home network, or notify the at least one optimal device of a storage location of the instruction so as to notify the at least one optimal device of the instruction.

20. The device of claim 14, wherein the operations further comprise receive the instruction, or read the instruction stored at a storage location so as to obtain the instruction.

21. The device of claim 14, wherein the DCT comprises:
a device name field or a device number field, a device attribute field, and a device attribute value field.

22. The device of claim 14, wherein the DCT is stored in at least one particular device in the home network, or stored by an external device outside the home network.

23. The device of claim 14, wherein the device queries for the at least one device according to a device log (DL).

24. The device of claim 23, wherein content of the DL comprises instruction content each time instructions are executed in the home network, a device name or a device number, an instruction execution time, and an instruction execution location.

25. A non-transitory computer readable medium, comprising executable instructions that, in response to execution, cause a first device of a home network comprising a processor to perform operations comprising:
receiving an instruction to be executed to perform a function in an environment in which the home network is installed;
querying, according to a device capability table (DCT), for at least one network device of a set of network devices of the home network that is determined to meet a defined condition associated with performing the function in the environment in which the home network is installed, wherein the at least one network device is at least one optimal device having an optimal effect associated with performing the function; and
in response to the at least one optimal device being determined not to comprise the first device, providing a notification of the instruction to the at least one optimal device that initiates the at least one optimal device to execute the instruction, and in response to the at least one optimal device comprising the first device, executing, by the first device the instruction,
wherein the at least one network device comprises a second device that has previously executed another instruction having the same instruction type as the instruction for another most number of times in a defined space of the environment.

26. The non-transitory computer readable medium of claim 25, wherein the operations further comprise, in response to a determination that there is no network device capable of executing the instruction in the home network, generating, by a network device of the home network, a message for recording that the instruction is not executed.

27. The non-transitory computer readable medium of claim 25, wherein the at least one network device comprises at least one third device having a better effect associated with performing the function than the device.

28. The non-transitory computer readable medium of claim 27, wherein the operations further comprise, in response to a determination that multiple third devices comprising the at least one third device are found in the query, selecting at least one of the multiple third devices to include in the at least one network device.

29. The non-transitory computer readable medium of claim 27, wherein the operations further comprise, in response to a determination that the first device has not found the at least one third device having the better effect associated with the performing of the function than the first device, selecting the first device as one of the at least one optimal device.

30. The non-transitory computer readable medium of claim 25, wherein the DCT comprises:

a device name field or a device number field, a device attribute field, and a device attribute value field.

31. The non-transitory computer readable medium of claim 25, wherein the DCT is stored in at least one network device in the home network, or stored by an external device outside the home network.

32. The non-transitory computer readable medium of claim 25, wherein the first device queries for the at least one network device according to a device log (DL).

33. The non-transitory computer readable medium of claim 32, wherein content of the DL comprises instruction content each time instructions are executed in the home network, a device name or a device number, an instruction execution time, and an instruction execution location.

34. The non-transitory computer readable medium of claim 32, wherein the DL is stored in at least one network device in the home network, or stored by an external device outside the home network.

35. The non-transitory computer readable medium of claim 25, wherein the instruction is a direction to play multimedia content, and the providing the notification comprises:

sending the multimedia content from the first device to the at least one optimal device, sharing the multimedia content with the at least one optimal device through the home network, or notifying the at least one optimal device of a storage location of the multimedia content.

36. The non-transitory computer readable medium of claim 25, wherein the providing the notification comprises sending the instruction by the first device to the at least one optimal device, sharing the instruction with the at least one optimal device via the home network, or notifying the at least one optimal device of a storage location of the instruction so as to notify the at least one device of the instruction.

37. The non-transitory computer readable medium of claim 25, wherein the receiving comprises the first device reading the instruction stored at a storage location.

* * * * *